United States Patent
Gerlitz et al.

(10) Patent No.: US 11,595,472 B2
(45) Date of Patent: Feb. 28, 2023

(54) CONTROLLING PACKET DELIVERY BASED ON APPLICATION LEVEL INFORMATION

(71) Applicant: Mellanox Technologies, Ltd., Yokneam (IL)

(72) Inventors: Or Gerlitz, Ramat-Gan (IL); Noam Bloch, Bat Shlomo (IL); Gal Yefet, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/151,697

(22) Filed: Jan. 19, 2021

(65) Prior Publication Data

US 2022/0232072 A1 Jul. 21, 2022

(51) Int. Cl.
*H04L 67/104* (2022.01)
*H04L 43/062* (2022.01)
*H04L 43/0894* (2022.01)
*H04L 67/00* (2022.01)
*H04L 67/01* (2022.01)

(52) U.S. Cl.
CPC ........ *H04L 67/1044* (2013.01); *H04L 43/062* (2013.01); *H04L 43/0894* (2013.01); *H04L 67/01* (2022.05); *H04L 67/34* (2013.01)

(58) Field of Classification Search
CPC ..... H04L 67/1044; H04L 67/34; H04L 67/42; H04L 43/062; H04L 43/0894
See application file for complete search history.

(56) References Cited

U.S. PATENT DOCUMENTS

| | | | |
|---|---|---|---|
| 7,209,994 B1 | 4/2007 | Klaiber et al. | |
| 7,222,203 B2 | 5/2007 | Madukkarumukumana et al. | |
| 7,302,511 B2 | 11/2007 | Jeyasingh et al. | |
| 7,616,563 B1 * | 11/2009 | Eiriksson | H04L 69/08 370/469 |
| 7,930,349 B2 | 4/2011 | Hussain et al. | |
| 8,180,944 B2 | 5/2012 | Serebrin et al. | |
| 8,306,062 B1 * | 11/2012 | Cohen | H04L 69/161 370/473 |
| 8,566,494 B2 | 10/2013 | Li et al. | |
| 8,589,587 B1 * | 11/2013 | Michailidis | H04L 69/12 709/227 |

(Continued)

OTHER PUBLICATIONS

Mellanox Technologies, "WinOF VPI for Windows", User Manual, pp. 1-117, Rev 4.40, Jul. 9, 2013.

(Continued)

*Primary Examiner* — Blake J Rubin
(74) *Attorney, Agent, or Firm* — Kligler & Associates Patent Attorneys Ltd

(57) ABSTRACT

A network device includes a network interface, a host interface and processing circuitry. The network interface is configured to connect to a communication network. The host interface is configured to connect to a host including a host processor running a client process. The processing circuitry is configured to receive packets originating from a peer process, to identify, in at least some of the received packets, application level information that is exchanged between the client process and the peer process, and to initiate reporting of one or more of the received packets to the client process, based on the application level information.

30 Claims, 5 Drawing Sheets

(56) References Cited

U.S. PATENT DOCUMENTS

| | | | |
|---|---|---|---|
| 8,886,862 B2 | 11/2014 | Kagan | |
| 8,897,132 B2 | 11/2014 | Feroz et al. | |
| 8,949,498 B2 | 2/2015 | Kagan | |
| 8,996,718 B2 | 3/2015 | Biswas | |
| 9,112,819 B2 | 8/2015 | Gopinath et al. | |
| 9,178,805 B2 | 11/2015 | Goel | |
| 9,306,793 B1* | 4/2016 | Craft | H04L 69/329 |
| 9,391,956 B2 | 7/2016 | Touboul | |
| 9,571,354 B2 | 2/2017 | Annamalaisami et al. | |
| 9,965,412 B2* | 5/2018 | Liu | G06F 13/4022 |
| 9,965,441 B2 | 5/2018 | Sajeepa et al. | |
| 10,015,104 B2 | 7/2018 | Pope et al. | |
| 10,380,047 B2 | 8/2019 | Degani | |
| 10,467,161 B2 | 11/2019 | Gilboa et al. | |
| 10,505,747 B2* | 12/2019 | Pope | G06F 13/385 |
| 10,505,848 B2* | 12/2019 | Underwood | H04L 47/741 |
| 10,642,775 B1* | 5/2020 | Voks | G06F 13/4059 |
| 11,451,647 B2* | 9/2022 | Lariviere | G06Q 40/02 |
| 2006/0182039 A1 | 8/2006 | Jourdain et al. | |
| 2008/0294825 A1 | 11/2008 | Mahalingam et al. | |
| 2010/0023666 A1 | 1/2010 | Mansell et al. | |
| 2010/0070677 A1 | 3/2010 | Thakkar | |
| 2010/0115514 A1 | 5/2010 | Maliszewski et al. | |
| 2010/0174841 A1 | 7/2010 | Bogin et al. | |
| 2010/0191885 A1 | 7/2010 | Serebrin et al. | |
| 2010/0191887 A1 | 7/2010 | Serebrin et al. | |
| 2010/0191888 A1 | 7/2010 | Serebrin et al. | |
| 2010/0191889 A1 | 7/2010 | Serebrin et al. | |
| 2010/0333101 A1 | 12/2010 | Pope et al. | |
| 2011/0106993 A1 | 5/2011 | Arinobu et al. | |
| 2011/0145459 A1 | 6/2011 | Conti et al. | |
| 2011/0179417 A1 | 7/2011 | Inakoshi | |
| 2012/0079175 A1 | 3/2012 | Flynn et al. | |
| 2012/0179742 A1 | 7/2012 | Acharya et al. | |
| 2013/0067193 A1 | 3/2013 | Kagan et al. | |
| 2014/0006667 A1 | 1/2014 | Sun et al. | |
| 2014/0040514 A1 | 2/2014 | Li et al. | |
| 2014/0143455 A1 | 5/2014 | Hayut et al. | |
| 2014/0229946 A1 | 8/2014 | van Riel | |
| 2014/0280813 A1* | 9/2014 | Ramachandran | H04L 67/14 709/223 |
| 2014/0304352 A1* | 10/2014 | Chaudhary | H04L 67/1029 709/208 |
| 2014/0310369 A1 | 10/2014 | Makhervaks et al. | |
| 2014/0310439 A1 | 10/2014 | Bshara et al. | |
| 2015/0127849 A1* | 5/2015 | Luo | H04L 47/12 709/235 |
| 2015/0172226 A1 | 6/2015 | Borshteen et al. | |
| 2015/0263968 A1* | 9/2015 | Jain | G06F 9/00 370/235 |
| 2015/0286594 A1 | 10/2015 | Degani | |
| 2015/0304281 A1* | 10/2015 | Kasturi | H04L 41/0893 726/1 |
| 2016/0057070 A1* | 2/2016 | Saxena | H04L 47/628 370/392 |
| 2016/0234127 A1* | 8/2016 | Agarwal | H04L 67/5682 |
| 2016/0277478 A1* | 9/2016 | Narasimhamurthy | H04L 69/16 |
| 2016/0286487 A1* | 9/2016 | Sachs | H04W 52/0216 |
| 2017/0048320 A1 | 2/2017 | Farmahini-Farahani et al. | |
| 2017/0168986 A1* | 6/2017 | Sajeepa | G06F 15/17331 |
| 2017/0249079 A1 | 8/2017 | Mutha et al. | |
| 2018/0167168 A1* | 6/2018 | Shoens | H04L 1/08 |
| 2018/0191629 A1* | 7/2018 | Biederman | H04L 69/22 |
| 2018/0191642 A1* | 7/2018 | Biederman | H04L 47/6275 |
| 2018/0267919 A1 | 9/2018 | Burstein | |
| 2018/0323913 A1* | 11/2018 | Chen | H04L 5/0055 |
| 2019/0044994 A1* | 2/2019 | Sarangam | H04L 67/02 |
| 2019/0116127 A1 | 4/2019 | Pismenny et al. | |
| 2019/0229903 A1* | 7/2019 | Balasubramanian | H04L 63/0485 |
| 2019/0238460 A1* | 8/2019 | Vasudevan | H04L 67/18 |
| 2019/0260686 A1* | 8/2019 | Bowers | H04L 47/31 |
| 2019/0342199 A1* | 11/2019 | Hurson | H04L 47/263 |
| 2019/0387079 A1* | 12/2019 | Pismenny | H04L 69/321 |
| 2020/0068048 A1* | 2/2020 | Hermesh | H04L 69/161 |
| 2020/0117605 A1* | 4/2020 | Cornett | H04L 49/9047 |
| 2020/0133909 A1* | 4/2020 | Hefty | H04L 69/22 |
| 2020/0210359 A1* | 7/2020 | Cornett | G06F 9/4812 |
| 2020/0313999 A1* | 10/2020 | Lee | H04L 69/22 |
| 2020/0389399 A1* | 12/2020 | Wang | H04L 45/66 |
| 2020/0403919 A1* | 12/2020 | Cui | H04L 63/0428 |
| 2020/0412659 A1* | 12/2020 | Arditti Ilitzky | H04L 43/087 |
| 2021/0092069 A1* | 3/2021 | Musleh | H04L 45/08 |
| 2021/0111996 A1 | 4/2021 | Pismenny et al. | |
| 2021/0117360 A1* | 4/2021 | Kutch | G06F 9/5083 |
| 2021/0243247 A1* | 8/2021 | He | H04L 67/63 |
| 2021/0288910 A1* | 9/2021 | Daly | H04L 47/22 |
| 2021/0297360 A1* | 9/2021 | Park | H04L 49/9084 |
| 2021/0320866 A1* | 10/2021 | Le | H04L 49/50 |
| 2021/0328930 A1* | 10/2021 | Nikolaidis | H04L 47/127 |
| 2021/0352023 A1* | 11/2021 | Syrivelis | G06F 13/20 |
| 2022/0085916 A1* | 3/2022 | Debbage | H04L 1/1635 |
| 2022/0124182 A1* | 4/2022 | Galles | H04L 67/02 |

OTHER PUBLICATIONS

Melllanox Technologies, "Linux/drivers/net/ethernet/mellanox/mlx4/en_cq.c", version 4.1, pp. 1-4, year 2007.

Mellanox Technologies, "Linux/drivers/net/ethernet/mellanox/mlx4/en_netdev.c", version 4.1, pp. 1-41, year 2007.

Intel Corporation, "Linux/drivers/net/ethernet/intel/ixgbe/ixgbe_main.c", pp. 1-92, version 4.1., years 1999-2014.

Intel Corporation, "Intel® Xeon® Processor E5-2600 v31 Product Family", Product brief, pp. 1-5, Aug. 21, 2014.

Yefet et al., U.S. Appl. No. 16/932,765, filed Jul. 19, 2020.

NVMe Over Fabrics standard, "NVM Express over Fabrics," Revision 1.1, pp. 1-82, Oct. 22, 2019.

Rescorla et al., "The Transport Layer Security (TLS) Protocol Version 1.3", Request for Comments 8446, pp. 1-160, Aug. 2018.

Belshe et al., "Hypertext Transfer Protocol Version 2 (HTTP/2)", Request for Comments 7540, pp. 1-96, May 2015.

Microsoft, "Receive Segment Coalescing (RSC)", pp. 1-3, Aug. 31, 2016 downloaded from https://docs.microsoft.com/en-us/previous-versions/windows/it-pro/windows-server-2012-r2-and-2012/hh997024(v=ws.11)#receive-segment-coalescing-rsc-1.

Corbert, "A reworked TCP zero-copy receive API", LWN.net, pp. 1-4, May 18, 2018 downloaded from https://lwn.net/Articles/754681/.

Kernelnewbies, "Linux4.18—Linux Kernel Newbies", pp. 1-16, Aug. 12, 2018 downloaded from https://kernelnewbies.org/Linux_4.18.

U.S. Appl. No. 16/932,765 Office Action dated Feb. 1, 2022.

\* cited by examiner

CONTROLLING PACKET DELIVERY BASED ON APPLICATION LEVEL INFORMATION

TECHNICAL FIELD

Embodiments described herein relate generally to data communication, and particularly to methods and systems for controlling data delivery between a network and a host via a network element, based on application level information.

BACKGROUND

In various systems, a host connects to a communication network using a network adapter. Some modern network adapters support reducing overhead related to communication handling from the host CPU. For example, the Large Receive Offload (LRO) is a technique in which a network adapter coalesces multiple packets of a common flow into a single large packet to be reported to the host CPU. A feature similar to the LRO, is the "Microsoft® RSC," wherein "Receive Segment Coalescing" is known by the acronym "RSC." In accordance with Microsoft's documentation, RSC is a stateless offload technology for offloading communication-related tasks from the CPU to an RSC-capable network adapter. In the description that follows the term "LRO" refers to both the LRO and Microsoft® RSC.

Another approach to reduce communication burden from the host CPU is referred to as "interrupt moderation." With interrupt moderation, the network adapter hardware does not always generate an interrupt immediately after it receives a packet from the network. Rather, the hardware waits for more packets to arrive, or for a certain timeout to expire, before generating an interrupt.

Interrupt moderation is known in the art. For example, U.S. Patent Application Publication 2017/0344277 describes an apparatus for communications that includes a CPU, a system memory, and a Network Interface Controller (NIC), which is configured to receive incoming data packets from a network, to post the received data packets in a designated queue for delivery to the CPU. The NIC issues interrupts to the CPU in response to the incoming data packets at a rate determined, for the designated queue, in accordance with an interrupt moderation parameter that is set for the queue.

In various systems, a client process communicates with peer client processes using communication protocols such as, for example, the Transport Layer Security (TLS) protocol, and/or the Hypertext Transfer Protocol (HTTP). The TLS protocol is specified, for example, in a Request For Comments (RFC) 8846, titled "The Transport Layer Security (TLS) Protocol Version 1.3," August 2018. The HTTP is described, for example, in a RFC 7540, titled "Hypertext Transfer Protocol Version 2 (HTTP/2)," May 2015.

SUMMARY

An embodiment that is described herein provides a network device that includes a network interface, a host interface and processing circuitry. The network interface is configured to connect to a communication network. The host interface is configured to connect to a host including a host processor running a client process. The processing circuitry is configured to receive packets from a peer process, to identify, in at least some of the received packets, application level information that is exchanged between the client process and the peer process, and to initiate reporting of one or more of the received packets to the client process, based on the application level information.

In some embodiments, in initiating the reporting, the processing circuitry is configured to select which of the received packets are to be reported to the client process. In other embodiments, the processing circuitry is configured to initiate the reporting by terminating a coalescing session that coalesces multiple packets into a single packet. In yet other embodiments, the processing circuitry is configured to terminate the coalescing session based on a session matching criterion and on one or more parameters selected from a list of parameters including: (i) a maximal coalesced packet size, and (ii) a coalescing timeout period.

In an embodiment, in initiating the reporting, the processing circuitry is configured to select a timing of reporting the one or more of the received packets. In another embodiment, the processing circuitry is configured to initiate the reporting by issuing an interrupt signal at the selected timing for notifying the client process of the one or more received packets. In yet another embodiment, the processing circuitry is configured to select the timing based on one or more parameters selected from a list of parameters including: (i) a number of packets to receive before issuing the interrupt signal, and (ii) a timeout period for issuing the interrupt signal.

In some embodiments, the processing circuitry is configured to initiate the reporting so as to reduce a number of cycles required by the host processor running the client process to handle the received packets. In other embodiments, the application level information specifies a message length to be received, and the processing circuitry is configured to determine, based on the message length, a number of packets to receive before reporting the message to the client process. In yet other embodiments, the processing circuitry is configured to initiate the reporting unconditionally, in response to identifying the application level information.

In an embodiment, the peer process runs on (i) a remote host coupled to the communication network, (ii) the host processor, or (iii) another processor of the host.

There is additionally provided, in accordance with an embodiment that is described herein, a method for communication, including, in a network device coupled to a host that comprises a host processor running a client process, receiving packets originating from a peer process. In at least some of the received packets, application level information that is exchanged between the client process and the peer process is identified. Reporting to the client process of one or more of the received packets is initiated, based on the application level information.

There is additionally provided, in accordance with an embodiment that is described herein, a network device that includes a network interface, a host interface and processing circuitry. The network interface is configured to connect to a communication network. The host interface is configured to connect to a host including a host processor running client processes. The processing circuitry is configured to select a Send Queue (SQ) among multiple SQs holding work requests that were posted on the SQs by the client processes for transmitting data to one or more destinations over the communication network, to retrieve work requests from the selected SQ for transmitting data to a given destination, to identify, in at least some of the retrieved work requests, application level information that is exchanged between a client process and a peer process, and to control an amount of data for transmitting continuously from the selected SQ to the given destination, based at least on the application level information.

In some embodiments, the processing circuitry is configured to select the SQ in accordance with a predefined schedule, and to control the amount of data for transmitting continuously from the selected SQ, based both on (i) a quality of service policy that divides an available bandwidth among the SQs, and (ii) the application level information.

There is additionally provided, in accordance with an embodiment that is described herein, a method, including, in a network device that connects to a communication network and to a host that runs client processes, selecting a Send Queue (SQ) among multiple SQs holding work requests that were posted on the SQs by the client processes for transmitting data to one or more destinations over the communication network. Work requests are retrieved from the selected SQ for transmitting data to a given destination. In at least some of the retrieved work requests, application level information that is exchanged between a client process and a peer process is identified. An amount of data for transmitting continuously from the selected SQ to the given destination is controlled, based at least on the application level information.

There is additionally provided, in accordance with an embodiment that is described herein, a network device that includes a network interface, a host interface and processing circuitry. The network interface is configured to connect to a communication network. The host interface is configured to connect to a host including a host processor running a client process that mediates between a remote process communicating with the host over the communication network and a storage device coupled to the host, using a remote storage protocol. The processing circuitry is configured to receive packets of the remote storage protocol from the remote process over the communication network, wherein the packets are related to performing a storage operation on the storage device. Identify, in at least some of the received packets, application level information that is exchanged between the storage device and the remote process, and to initiate reporting of one or more of the received packets to the client process, based on the application level information.

There is additionally provided, in accordance with an embodiment that is described herein, a method, including, in a network device that connects to a communication network, and to a host including a host processor running a client process that mediates between a remote process communicating with the host over the communication network and a storage device coupled to the host, using a remote storage protocol, receiving packets of the remote storage protocol originating from the remote process over the communication network, the packets are related to performing a storage operation on the storage device. In at least some of the received packets, application level information that is exchanged between the storage device and the remote process is identified. Reporting of one or more of the received packets to the client process is initiated, based on the application level information.

These and other embodiments will be more fully understood from the following detailed description of the embodiments thereof, taken together with the drawings in which:

DETAILED DESCRIPTION OF EMBODIMENTS

Overview

Figure 1:
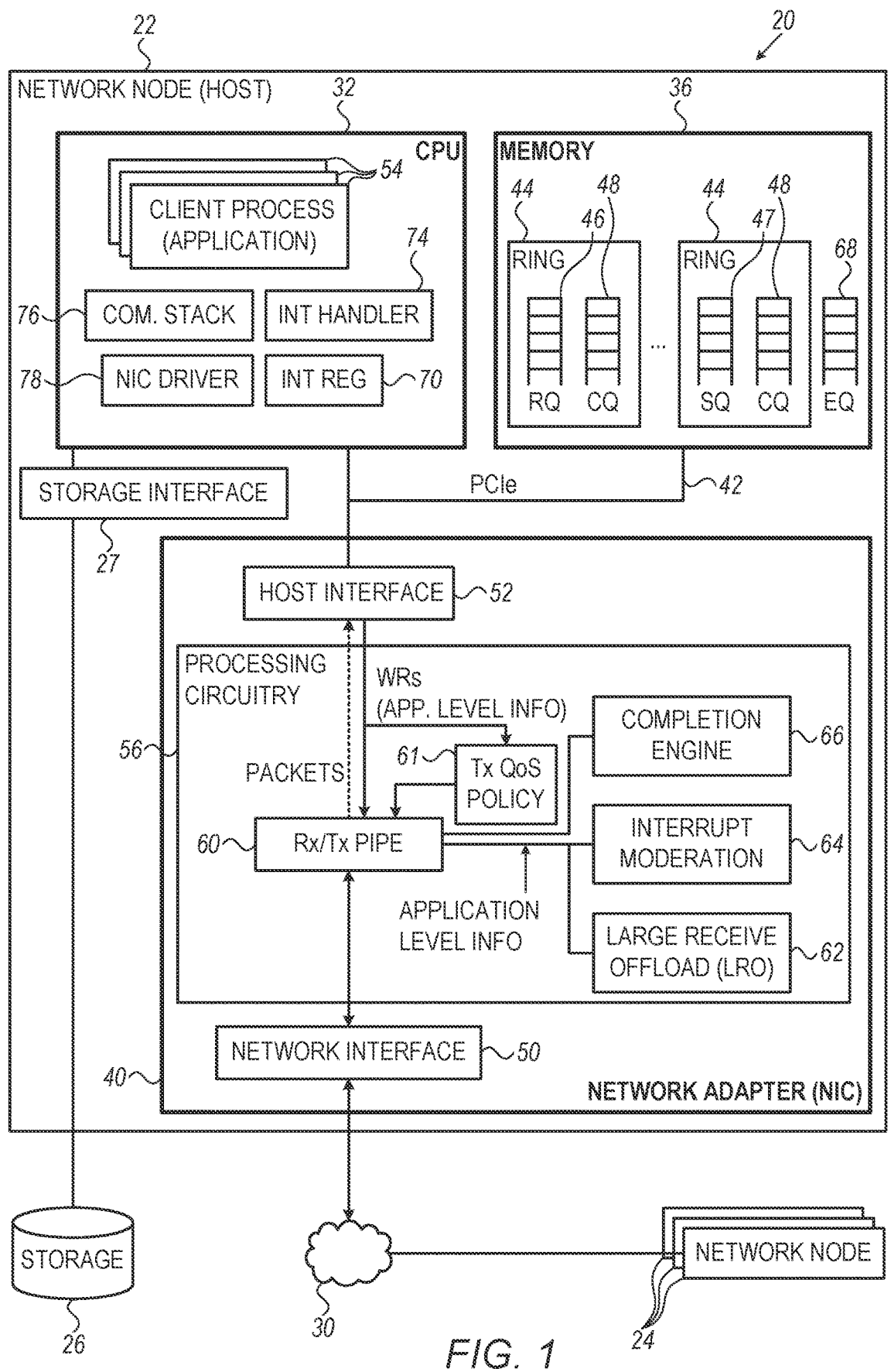
FIG. 1 is a block diagram that schematically illustrates a computer system, in accordance with an embodiment that is described herein.

Embodiments that are described herein provide methods and systems for controlling data delivery between a communication network and a host via a local network adapter, based on application level information.

In various computing systems, a host accesses a communication network using a suitable network device such as a network adapter. The host CPU runs client processes that communicate over the communication network with other client processes running remotely on peer hosts. A "client process" is also referred to herein as an "application program." In the description that follows the terms "network device" and "network adapter" are used interchangeably.

In a naïve approach, the network adapter notifies the host of each received packet individually, e.g., by generating an interrupt signal. In response to the interrupt, the host CPU suspends current processing and calls an interrupt handler to serve the event, e.g., by invoking a suitable communication stack. Notifying the reception of each packet individually is highly inefficient because the host CPU is required to temporarily suspend processing for each received packet, and because each of the received packets is processed separately through the communication stack.

Known methods for reducing communication handling burden from the host CPU include, for example, the Large Receive offload (LRO) method and the interrupt moderation method. In LRO, the network adapter coalesces multiple packets of a common flow or session into a single larger packet, and notifies the host CPU of the coalesced packet, e.g., by posting a corresponding completion notification in a completion queue. In interrupt moderation, rather than generating an interrupt per packet, the network adapter buffers multiple packets, and generates an interrupt to the host notifying reception of multiple packets. As will be described below, the ability of the LRO and interrupt moderation methods to reduce packet reception burden from the host CPU can be significantly improved based on application level information that is available in the received packets.

In some embodiments, the network adapter inspects headers of the received packets for various purposes, wherein the information inspected may be related to one or more communication layers, specified, for example, in the Open Systems Interconnection (OSI) model.

In the present context and in the claims, the term "application level information" refers to information related to layers higher in the OSI model than the underlying transport layer.

In some systems, a network adapter hardware may offload to hardware various tasks using information available in headers of the underlying transport layer protocol (e.g., TCP or UDP). All methods of this sort, however, make no use of any information related to layers higher than the transport layer in the OSI model.

In some systems, the network adapter uses information in headers related to the application layer, e.g., for enhancing performance of inter-client application protocols that are not related explicitly to packet reception. Application protocols of this sort include, for example, the Non-Volatile Memory Express (NVMe) over TCP protocol, the Transport Layer Security (TLS) protocol and the Hypertext Transfer Protocol (HTTP). The network adapter may enhance the performance of such application protocols based on application layer headers. Such usage of application layer information does not, however, reduce from the host CPU burden related explicitly to packet reception.

In summary, in all network adapter offloading methods known to the inventors, the network adapter requires no usage of application level information at all, or requires application level information only for purposes other than reducing burden related to handling packet reception from the host CPU.

Consider now an embodiment of a network device connected to a communication network, and to a host comprising a host processor running a client process. The network device further comprises processing circuitry, configured to receive packets from the communication network, to identify, in at least some of the received packets, application level information that is exchanged between the client process and a peer process, and to initiate reporting of one or more of the received packets to the host processor, based on the application level information.

In some embodiments, in initiating the reporting, the processing circuitry selects which of the received packets are to be reported to the host processor. For example, the processing circuitry may initiate the reporting by terminating a current coalescing session, e.g., based on a session matching criterion and on one more parameters selected from (i) a maximal coalesced packet size, and (ii) a coalescing timeout period.

In some embodiments, in initiating the reporting, the processing circuitry selects a timing of reporting the one or more of the received packets. For example, the processing circuitry initiates the reporting by issuing an interrupt signal at the selected timing for notifying the host processor of the one or more received packets. The processing circuitry may select the timing based on one or more parameters selected from (i) a number of packets to receive before issuing the interrupt signal, and (ii) a timeout period for issuing the interrupt signal.

In some embodiments, the processing circuitry is configured to initiate the reporting so as to reduce the number of cycles required by the host processor to handle the received packets.

In some embodiments, the application level information specifies a message length to be received. The message may be fragmented and transmitted from a remote host in multiple packets. In such embodiments, the processing circuitry determines, based on the message length, the number of packets to receive before reporting the message to the host processor. The processing circuitry thus delays the reporting, for providing the client process with the entire message, thereby reducing burden from host processor in handling multiple packets that carry parts of the message. This also enhance performance of the client process that is notified of full messages it can process.

In an embodiment, the processing circuitry initiates the reporting unconditionally, in response to identifying the application level information. In this embodiment, the processing circuitry promptly reports to the client process of currently available data that the client process may use before the network adapter receives the entire message. This feature enhances the performance of the application protocol executed by the client process.

In the egress direction, the network adapter may use application level that is available in work requests for improving transmission performance, as described herein.

In some embodiments, client processes post work request specifying data transmission operations in Send Queues (SQs) accessible to the network adapter. The network adapter scans the SQs in a predefined order and transmits a burst of data from a visited SQ before proceeding to the next SQ.

In an embodiment, the processing circuitry selects a SQ among multiple SQs holding work requests that were posted on the SQs by the client processes for transmitting data to one or more destinations over the communication network. The processing circuitry retrieves work requests from the selected SQ for transmitting data to a given destination, and identifies, in at least some of the retrieved work requests, application level information that is exchanged between a client process and a peer process. The processing circuitry controls an amount of data for transmitting continuously from the selected SQ to the given destination, based at least on the application level information.

In some embodiments, the processing circuitry selects the SQ in accordance with a predefined schedule, and controls the amount of data for transmitting continuously from the selected SQ, based both on (i) a quality of service policy that divides an available bandwidth among the SQs and (ii) the application level information. In an example embodiment, using application level information that specifies a message length, the network adapter extends the transmission burst size so as to complete the message transmission in the current SQ selection cycle, rather than in a subsequent cycle.

In the disclosed techniques, a network adapter improves reception and transmission performance based on application level information. In the ingress direction, the disclosed network adapter reduces packet reception burden from the host CPU based on application level information carried in received packets. To this end, the functionality of the LRO and interrupt moderation methods are improved by using the application level information. In the egress direction, the network adapter improves transmission performance based on application level information present in work request specifying data transmission operations. Such enhancements in the ingress and egress directions are not possible without using the application level information.

System Description

FIG. 1 is a block diagram that schematically illustrates a computer system 20, in accordance with an embodiment that is described herein.

Computer system 20 is presented as an example of an operating environment in which the present improved techniques of Large Receive Offload (LRO), interrupt moderation or both in the ingress direction, and/or data transmission in the egress direction, may be applied. The principles of the disclosed embodiments, however, may similarly be implemented, mutatis mutandis, in other computer systems that communicate data packets or other high-speed I/O traffic on one or more channels, and all such implementations are considered to be within the scope of the present invention.

In the example of FIG. 1, a network node 22 in computer system 20 communicates with peer network nodes 24 over a high-speed packet network 30 such as an InfiniBand or Ethernet switch fabric, and with a storage device 26. Network nodes 22 and 24 are also referred to herein as "host computers" or simply "hosts" for brevity. Network node 22 comprises a CPU 32, and a memory 36 (e.g., a system memory) that stores, for example, program instructions and data. In some embodiments, CPU 32 may comprise multiple processing cores (not shown). Storage device 26 may comprise any suitable storage device implemented using any suitable storage technology, e.g., a Solid-State Drive (SSD) implemented in a Nonvolatile Memory (NVM) technology such as Flash. CPU 32 typically connects to storage device 26 using a suitable storage interface 27, such as, for example, the Serial AT Attachment (SATA) storage interface. In other embodiments, CPU 32 may connect to storage device 26 via a bus of the CPU, e.g., the PCIe bus (42) described below. Storage device 26 may reside within or externally to the cassis of host 22.

A client process 54 (also referred to as an application program) running on CPU 32 may communicate with an application program running on a remote node 24 using any suitable communication protocol such as, for example, the TLS protocol or the HTTP (e.g., using a TCP connection).

An application program running on a remote node 24 may communicate (over communication network 30 and via network node 22) with storage device 26 using any suitable storage protocol such as, for example, the NVMe over TCP (NVMe/TCP) protocol.

Network node 22 is connected, by a network adapter 40 to packet network 30. In the present example, network adapter 40 communicates with CPU 32 and memory 36 via a suitable link or bus 42, such as a Peripheral Component Interconnect Express-PCI Express® bus. Network adapter 40 may comprise any suitable network device such as, for example, a Network Interface Controller (NIC). In some embodiments, CPU 32 communicates with network adapter 40 and with memory 36 over different respective buses.

NIC 40 supports concurrent communications on multiple rings 44 between packet network 30 and client processes 54 running on CPU 32. Although for the sake of simplicity, only two rings are shown in FIG. 1, in practice, the number of rings is typically equal at least to the number of cores within CPU 32 and may be much larger.

Each ring 44 represents a transport channel, which typically comprises a Receive Queue (RQ) 46 for incoming packets, and/or a Send Queue (SQ) 47 for outgoing packets, along with a Completion Queue (CQ) 48. In an InfiniBand environment, for example, the send and receive queues are referred to as a work Queue Pair (QP), whereas Ethernet and other protocols may use other names for these sorts of constructs. Typically, RQs 46, SQs 47 and CQs 48, are maintained in memory 36, where they can be accessed both by CPU 32 and NIC 40, but alternatively, a separate, dedicated memory may be used for this purpose.

NIC 40 comprises a network interface 50, which connects to packet network 30, and a host interface 52, which connects to bus 42. Packet processing circuitry 56, coupled between network interface 50 and host interface 52, comprises a receive/transmit (Rx/Tx) pipe 60 comprising a receive pipe and a transmit pipe (not show). The receive pipe part of Rx/Tx pipe 60 parses the headers of incoming packets and writes the packets (or at least the packet payload data) to appropriate buffers in memory 36. The transmit pipe part of Rx/Tx pipe 60 receives Work Requests (WRs) from CPU 32, the WRs specifying data transmission operations to multiple destinations such as remote nodes 24. The Tx pipe handles the data transmission based on a Quality of Service (QoS) policy 61. As will be described in detail further below, the packet processing circuitry manages data transmission based on the QoS policy and on application information written in the WRs. After the transmit pipe completes execution of a WR, it posts a completion entry to a relevant CQ 48. The term "packet processing circuitry" is also referred to as "processing circuitry" for brevity.

In the description that follows, packet processing circuitry 56 is also referred to as "processing circuitry" for brevity.

Under the control of a LRO module 62, an interrupt moderation module 64 or both, the receive pipe of Rx/Tx pipe 60 receives one or more packets from the network before reporting them to the host. After the receive pipe has received a message (which comprises one or more incoming packets) from packet network 30 and written the message data to memory 36, a completion engine 66 in packet processing circuitry 56 posts a completion entry to CQ 48. (Posting the completion entry to CQ 48, while writing the corresponding packet payload to the appropriate buffer, is one way of "posting the packet" to the designated queue. Alternatively, the processing circuitry may post packets to their respective queues using other suitable packet queuing and forwarding techniques.

In general, when LRO module 62 and interrupt moderation module 64 are disabled, completion engine 66 will write an event to an Event Queue (EQ) 68 and will issue an interrupt to an interrupt register 70 in the appropriate CPU core for each completion that it writes to CQ 48 on each ring 44 used in the ingress direction. The interrupt causes CPU 32 (or a relevant core within CPU 32) to suspend other processes and call an interrupt handler 74 to read and service the event. In response to an interrupt signal, or to detecting a polled completion notification, the posted packet is processed by a communication stack software 75 running on CPU 32. The communication stack may comprise, for example, a transport layer software that handles reliable packet reception for higher layers such as the application layer.

In computer system 20, when interrupt moderation functionality is enabled, interrupt moderation module 64 reduces the rate of interrupts for at least some of the rings serving in the ingress direction. The interrupt moderation module sets interrupt moderation parameters for each ring, such as the timeout period between interrupts and/or the threshold packet count required to issue an interrupt. The packet count (or equivalently, the completion count) parameter indicates, for each ring, the threshold number of packets (or completions) that have to be aggregated before an interrupt is issued to CPU 32. The timeout parameter indicates that from the time a packet (or completion) is received, NIC 40 will issue an interrupt when the timeout expires even if the aggregated packet or completion count has not yet reached the threshold packet count. Interrupt moderation module 64 may control other traffic-related parameters of rings 44, as well, such as buffer parameters. A cycle of aggregating packets and issuing a corresponding interrupt is referred to herein as an "interrupt moderation session."

In some embodiments, interrupt moderation module 64 comprises an interrupt moderation state comprising, for example, a packet count variable that counts the number of packets received since issuing a recent interrupt, and a timeout counter of the time elapsed since issuing the recent interrupt. Alternatively, the timeout counter comprises a countdown timer.

In some disclosed embodiments, interrupt moderation module 64 determines the timing of a subsequent interrupt based on application level information present in the received packets. In such embodiments, the selected timing may be advanced or delayed relative to a timing that would be determined without using the application level information. Example embodiments of this sort will be described in detail below.

In computer system 20, when LRO functionality is enabled, packets are coalesced for at least some of the rings operating in the ingress direction, by LRO module 62. The LRO module sets LRO parameters for each ring, such as the threshold number of packets to coalesce before issuing a completion notification, and/or the timeout period for termination packet coalescing even if the number of coalesced packets is lower than the threshold number. The timeout parameter indicates that from the time packet coalescing starts, NIC 40 will terminate packet coalescing even if the number of coalesced packets has not yet reached the threshold number of packets to coalesce.

In some embodiments, LRO module 62, interrupt moderation module 64 or both, may be implemented in cooperation between software running on CPU 32 and hardware logic in NIC 40. In such embodiments, the software components of LRO module 62 and interrupt moderation module 64 may be integrated with or operate in conjunction with a NIC driver software 78. In alternative embodiments, LRO module 62 and/or interrupt moderation module 64 may be implemented entirely in hardware logic and/or firmware on an embedded processor within NIC 40 or a separate control unit.

A cycle of coalescing packets into a large packet and reporting the coalesced packet to the host is referred to herein as a "LRO session."

In some embodiments, LRO module 62 comprises a LRO state comprising, for example, a packet count variable that counts the number of currently coalesced packets, and a timeout counter of the time elapsed since receiving the first packet of the current LSO session. Alternatively, the timeout counter comprises a countdown timer.

In some disclosed embodiments, LRO module 62 determines the number of packets to coalesce in the current LRO session based on application level information present in the received packets. The LRO module may determine a number of packets to coalesce that is larger or smaller than the number that the LRO module would determine without using the application level information. Example embodiments of this sort will be described in detail below.

Reducing CPU Communication Overhead Based on Application Level Information

As noted above, in the ingress direction, a network adapter (e.g., 40) may inspect headers of one or more layers, e.g., of the OSI model in packets received from the communication network in implemented various offloading methods.

The Open Systems Interconnection (OSI) model partitions data flow in a communication system into seven abstraction layers. In each layer, entities in the communicating hosts exchange Protocol Data Units (PDUs) with one another, in accordance with a communication protocol used in that layer.

The fourth to seventh layers in the OSI model are in particular relevant to the present application. These layers are known as the "transport layer," "session layer," "presentation layer" and "application layer."

The transport layer provides reliable end-to-end communication. The session layer establishes and terminates connections between peer hosts. The presentation layer handles formatting and delivery of information to the application layer. The application layer, which is closest to the end user, refers in the present context to both the underlying communication protocol used by the client process or application program (54), and the end-user software that uses that communication protocol.

Enhanced LRO Method

A flow may be identified, for example, using a five-tuple comprising a source IP address, a source port, a destination IP address, a destination port, and a protocol used, e.g., TCP or UDP. In some embodiments, in the ingress direction, the network adapter directs packets belonging to the same flow to a common RQ. Since in practice a number M of RQs typically serve a number N of flows that is much higher than M, the network adapter uses a many-to-one mapping of flows to RQs. As a result, each RQ typically serves multiple different flows. The many-to-one mapping may be carried out in hardware by the network adapter applying a hash function to one or more fields in the packet, and use the hash result as an RQ identifier. Alternatively, the network adapter may receive from the host CPU rules that associate between flows and corresponding the serving RQs.

In some embodiments, the network adapter coalesces packets belonging to the same flow using an LRO session. When the network adapter performing an LRO session of a first flow being served by a given RQ, receives a packet of a second flow served by the same RQ, the network adapter is required to terminate the LRO session of the first flow and start an LRO session for the second flow. In the method described blow, the network adapter uses improved criteria for terminating an LRO session, based on application level information.

Figure 2:
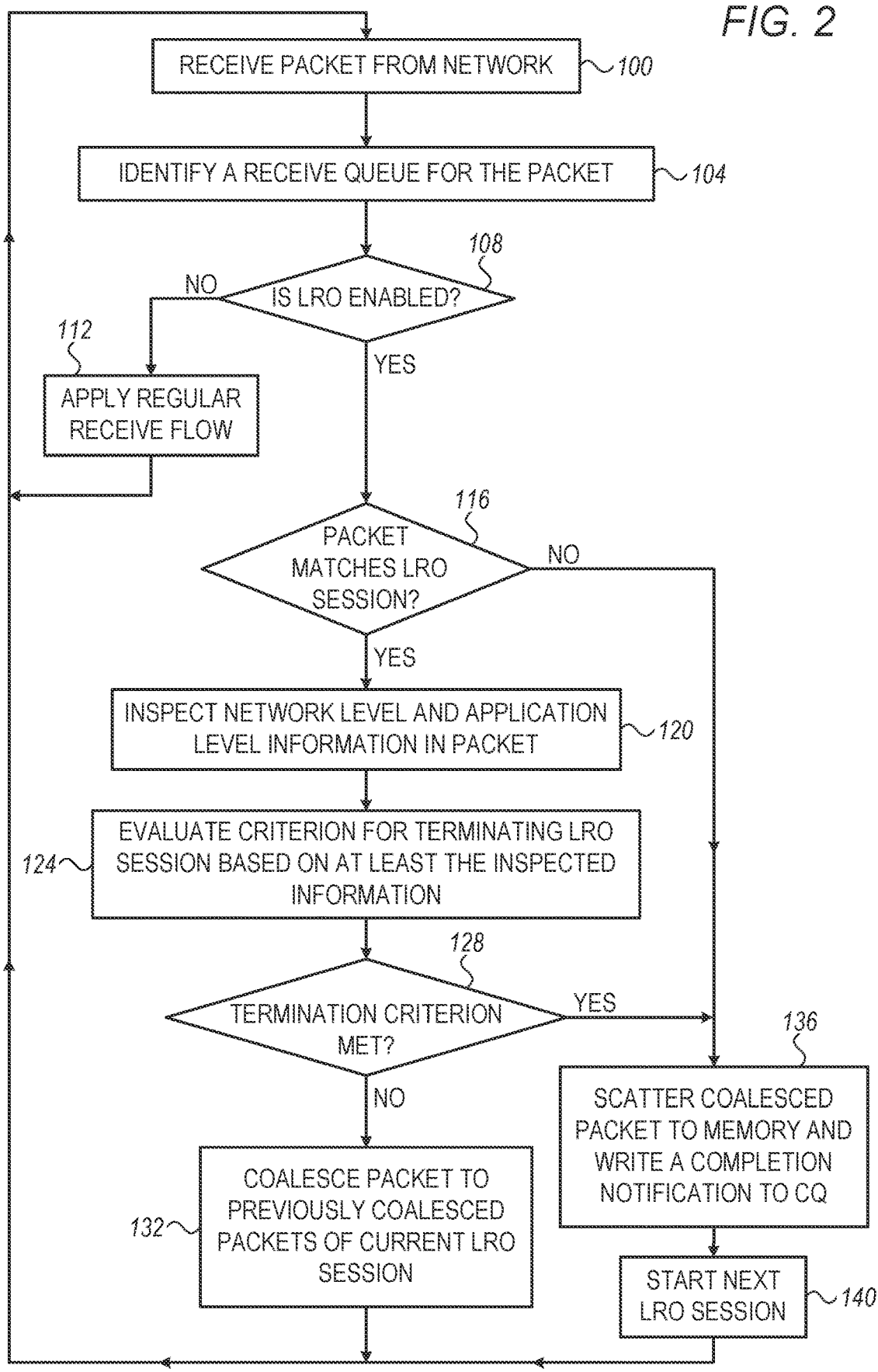
FIG. 2 is a flow chart that schematically illustrates a method for performing improved Large Receive Offload (LRO), based on application level information, in accordance with an embodiment that is described herein.

FIG. 2 is a flow chart that schematically illustrates a method for performing improved Large Receive Offload (LRO), based on application level information, in accordance with an embodiment that is described herein.

The method will be described as executed by network adapter 40 in FIG. 1, and specifically by processing circuitry 56. It is further assumed that the processing circuitry has started a given LRO session in LRO module 62 for coalescing packets of a given flow associated with a given RQ 46.

The method begins with processing circuitry 56 receiving a packet from packet network 30 via network interface 50, at a packet reception step 100. At a queue identification step 104, the receive pipe of Rx/Tx pipe 60 of the processing circuitry, identifies a RQ 46 associated (e.g., via flow to which the packet belongs) with the received packet. For example, RQs are assigned to handle certain flows or sessions, and the receive pipe identifies that the received packet belongs to a given flow assigned to the RQ in question. As noted above, a flow may be identified, for example, using a five-tuple comprising source and destination IP addresses, source and destination port numbers, and the protocol used.

At a LRO mode checking step 108, processing circuitry 56 checks whether LRO module 62 is enabled (at least for the given flow), and if not, proceeds to a regular reception flow step 112, at which the processing circuitry issues a separate completion notification for each of the received packets. Otherwise, LRO module 62 is enabled for the given flow, and the processing circuitry proceeds to a LRO matching query step 116. At step 116, the processing circuitry checks whether the packet received at step 100 is associated with the given LRO session, e.g., by checking whether the packet belongs to the given flow.

When at step 116 the packet matches the current LRO session, or when the received packet starts a LRO session for the given RQ, the processing circuitry proceeds to inspect network level information and application level information in the received packet, at an inspection step 120. The network level information refers to relevant layers lower than the application level, e.g., the transport layer (L4 in the OSI model e.g., TCP) and/or the IP layer (L3 in the OSI model). At a termination criterion evaluation step 124, processing circuitry 56 evaluates, based on at least the inspected information (typically also based on the LRO state), a criterion for terminating the current LRO session. The basic criterion for terminating a LRO session is based on the LRO parameters, e.g., the number of packets to coalesce and the LRO timeout period, as described above. LRO termination may by also based on information in TCP and/or IP headers. For example, termination of a LRO session may be based on a TCP PUSH flag, indicating to pass the data to the receiving process without waiting for more data from the sending TCP.

In some embodiments, based on the application level information, the processing circuitry identifies that reporting the currently coalesced packet would be too early for the designated application program. This may occur, for example, when the packets coalesced in the present LRO session contain only part of the application PDU, record or message. In this case, based on the application level information, the processing circuitry specifies a criterion that extends the LRO session to coalesce one or more additional packets as appropriate. In other embodiments, based on the application level information, the processing circuitry detects that reporting the coalesced packet using the basic criterion would delay an action that the application program could take at the present time. In this case, based on the application level information, the processing circuitry specifies a criterion that shortens the LRO session as appropriate.

At a termination checking step 128, the processing circuitry checks whether the termination criterion of step 124 is met, and if not, proceeds to a coalescing step 132. At step 132 the processing circuitry coalesces the received packet to previously coalesced packets in the current LRO session, for example, the processing circuitry coalesces the payload of the received packet to coalesced payloads of previously received packets of the LRO session. At step 132, the processing circuitry also updates the LRO state.

When at step 128 the termination criterion is met, the processing circuitry terminates the current LRO session at a LRO session termination step 136. At step 136, the processing circuitry scutters the packet coalesced in the current LRO session to memory 36 and posts a corresponding completion notification to CQ 48 in the same ring of the given RQ 46. CPU 32 will poll the CQ or receive an interrupt signal for checking the CQ, and forward the coalesced packet for processing by communication stack 76.

At a LRO session restarting step 140, the processing circuitry starts a subsequent LRO session. To this end, the processing circuitry resets the LRO state, e.g., by zeroing the state variable holding the number of coalesced packets (or completions) and restarting the LRO timeout count. The processing circuitry may start the new LRO session with the same or different LRO parameters as the recently terminated LRO session.

Following each of steps 112, 132 and 140, processing circuitry 56 loops back to step 100 to receive a subsequent packet from the network.

Enhanced Interrupt Moderation Method

Figure 3:
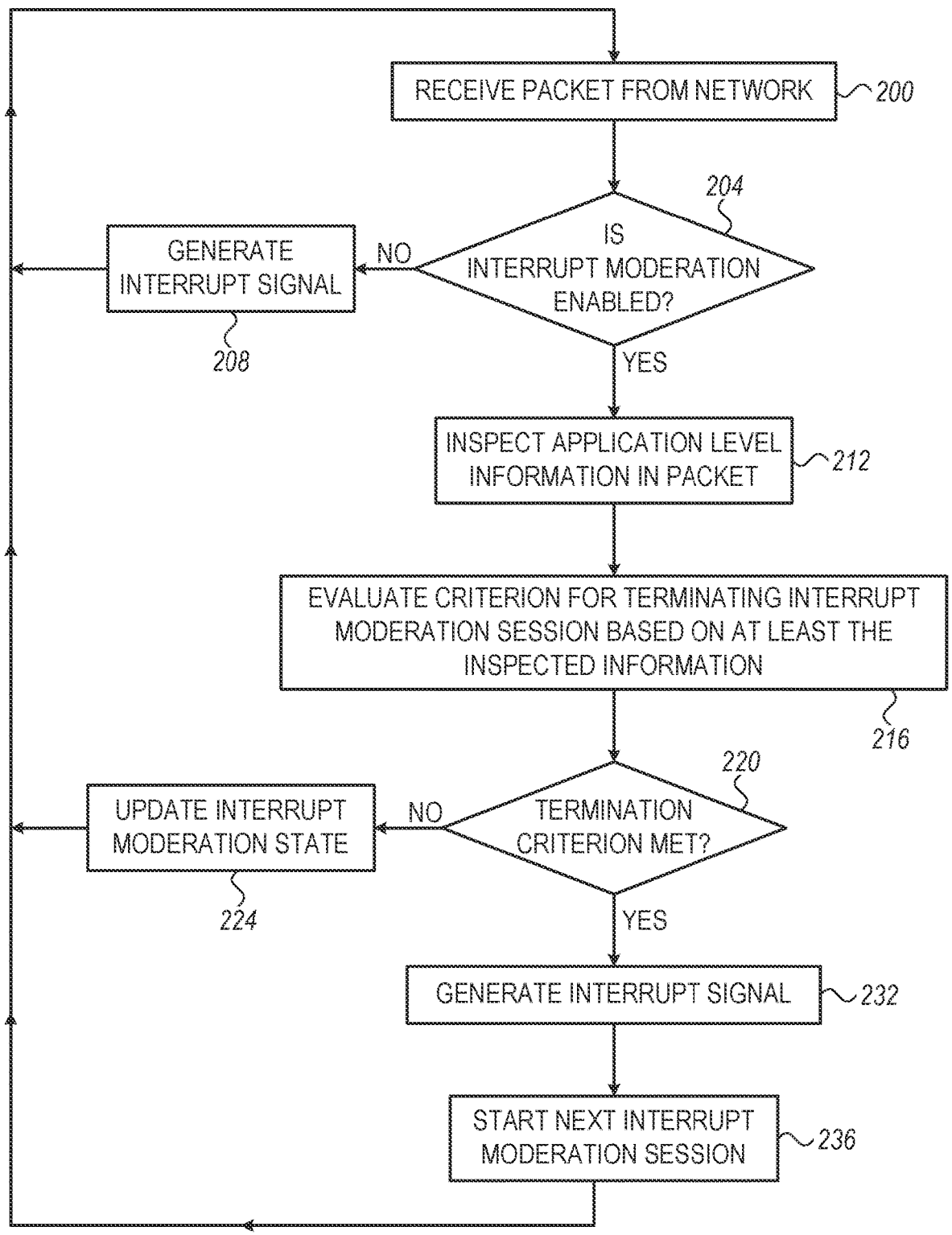
FIG. 3 is a flow chart that schematically illustrates a method for performing improved interrupt moderation, based on application level information, in accordance with an embodiment that is described herein.

FIG. 3 is a flow chart that schematically illustrates a method for performing improved interrupt moderation, based on application level information, in accordance with an embodiment that is described herein.

The method will be described as executed by processing circuitry 56 of NIC 40 in FIG. 1.

The method begins with processing circuitry 56 receiving a packet from packet network 30 via network interface 50, at a packet reception step 200.

At an interrupt moderation mode checking step 204, processing circuitry 56 checks whether interrupt moderation module 64 is enabled, and if not, proceeds to a signaling step 208, at which the processing circuitry issues an interrupt signal to notify CPU 32 to handle the received packet. Otherwise, interrupt moderation module 64 is enabled, and the processing circuitry proceeds to inspect application level information in the received packet, at an inspection step 212.

At a termination criterion evaluation step 216, the processing circuitry evaluates, based on at least the information moderation information (typically also based on the interrupt moderation state), a criterion for terminating the current interrupt moderation session. The basic criterion for terminating an interrupt moderation session is based on the interrupt moderation parameters, e.g., the number of packets to aggregate before issuing in interrupt, and the interrupt moderation timeout period.

In some embodiments, based on the application level information, the processing circuitry identifies that reporting the currently aggregated packets would be too early for the designated application program (54). In this case, based on the application level information, the processing circuitry specifies a criterion that extends the interrupt moderation session to aggregate one or more additional packets as appropriate. In other embodiments, based on the application level information, the processing circuitry identifies that reporting the currently aggregated packets using the basic criterion would delay an action that the designated application program could take at the present time. In this case, based on the application level information, the processing circuitry specifies a criterion that shortens the interrupt moderation session as appropriate.

At a termination checking step 220, the processing circuitry checks whether the termination criterion of step 216 is met, and if not, proceeds to update the interrupt moderation state, at a state updating step 224. Otherwise, the processing circuitry generates an interrupt signal, at an interrupt moderation signaling step 232.

At an interrupt moderation restarting step 236, the processing circuitry starts a subsequent interrupt moderation session. To this end, the processing circuitry resets the interrupt moderation state, e.g., by zeroing the state variable holding the number of aggregated packets (or completions) and restarting the interrupt moderation timeout count.

Following each of steps 208, 224 and 236, processing circuitry 56 loops back to step 200 to receive a subsequent packet from the network.

Enhanced Methods for Packet Reporting in Example Storage and Communication Protocols In certain scenarios, performing the LRO and interrupt moderation methods, based on application level information, enables the network adapter to better tune session termination to improve performance. For example, without using application level information, the network adapter would undesirably terminate a LRO session and/or an interrupt moderation session too early or too late for the application program, which causes performance degradation.

An early reporting may occur, for example, when the application program expects to receive a full massage, but the network adapter reports receiving partial parts of the message before the entire message is received. A late reporting may occur, for example, when the network adapter delays the reporting until receiving a full a message, even though the application program could benefit from receiving partial parts of the message before the full message is received.

Now are described example embodiments, in which the network adapter tunes LRO session termination based on application level information, in example storage and communication protocols.

Consider, for example, the Non-Volatile Memory Express (NVMe) over Fabrics (NVMe-F), which is a family of protocols, for accessing a remote NVMe device over a network fabric. Currently, the NVMe-F standard supports the transport protocols: Remote Direct Memory Access (RDMA), TCP and Fibre Channel (FC). NVMe over RDMA can be used over an IB fabric, or using the RoCE protocol over an Ethernet fabric. The NVMe-F is described, for example, in a standard entitled "NVM Express™ over Fabrics," Revision 1.1, Oct. 22, 2019. NVMe over RDMA and NVMe over TCP are described in sections 7.3 and 7.4 of the standard.

In some embodiments, a remote node 24 (serving as an initiator) communicates over packet network 30 with storage device 27 of host 22 (serving as a target), by exchanging PDUs of the NVMe/TCP Protocol.

In using a remote storage protocol such as NVMe over TCP and NVMe over RDMA, a client process 54 mediates between a remote client running on a remote node 24 (via the communication network and network adapter 40) and storage device 26 (via storage interface 27), using a suitable remote storage protocol. In some embodiments described above, application aware optimization techniques were carried out for LRO, interrupt-moderation and transmission QoS. Note that the interrupt moderation and transmission QoS techniques apply to both NVMe over TCP and NVMe over RDMA, whereas LRO applies only to NVMe over TCP. Using such optimization techniques in remote access to the storage device reduces overhead from the host.

In an example scenario, the initiator performs an I/O write operation by sending a PDU to host 22. For example, the initiator sends a 128 Kbytes PDU fragmented into multiple TCP packets. At the target side (host 22), packet processing circuitry 56 receives the TCP packets comprising the PDU, and inspects application level information in one or more TCP packets of the PDU. The application level may comprise, for example, the PDU length, which is unavailable in headers of the transport layer (e.g., TCP) or lower layers.

Based on the inspected application level information (e.g., the PDU length), the processing circuitry configures interrupt moderation module 64 to delay issuing an interrupt signal until the entire PDU is received. In another embodiment, based on the application level information, the processing circuitry configures LRO module 62 to coalesce the packets of the entire PDU, before notifying completion to the host. In some embodiments, the maximal size of a coalesced packet is 64 Kbytes, which is the maximum size of an IP packet. In some embodiments, the processing circuitry configures both interrupt moderation module 64 and LRO module 62 as described above, so as to generate a single interrupt for the coalesced packet comprising the entire PDU.

In another example scenario, the host 24 (serving as an initiator) performs an I/O read batch operation. In this case, host 22 (serving as the target) receives from the initiator multiple packets, wherein each packet typically carries multiple requests for the target application to serve. In this scenario, it would be advantageous to start serving the read requests promptly, e.g., by issuing an interrupt or terminating an LRO session.

In one embodiment, for promptly reporting a packet of the I/O read batch, the processing circuitry in host 22 configures interrupt moderation module 64, based on inspected application level information, to issue an interrupt unconditionally of the interrupt moderation state. In another embodiment, based on the inspected application level information, the processing circuitry configures LRO module 62 to refrain from coalescing at least part the packets of I/O batch, unconditionally of the LRO state. Note that the application level information is unavailable in headers of the transport layer or lower layers.

An application program may communicate with peer application programs using communication protocols such as, for example, the Transport Layer Security (TLS) protocol, and/or the Hypertext Transfer Protocol (HTTP).

The TLS protocol is a cryptographic protocol that provides communication security, e.g., privacy and data integrity, between two or more communicating application programs. In using TLS, the communicating entities send and receive TLS records encapsulating the data to be exchanged. The length of a TLS record is typically available in a relevant field within the TLS record.

In some embodiments, host 22 communicates securely with another host 24 over packet network 30 using the TLS protocol. For example, host 22 receives TLS records from a network node 24 over the packet network. In some embodiments, processing circuitry 56 in host 22 receives a TLS record that was fragmented and sent by the remote network node 24 in multiple packets. Processing circuitry 56 of host 22 inspects application level information in the received packets of the TLS record, such as the length of the TLS record. In an embodiment, based on the inspected application level information (e.g., the length of the TLS record) the processing circuitry configures LRO module 62 to aim coalescing and notifying the entire packets of the TLS record before posing a corresponding completion notification. In another embodiment, packet processing circuitry 56 configures interrupt moderation module 64 to aim generating an interrupt signal after receiving the entire packets comprising the TLS record.

The Hypertext Transfer Protocol (HTTP) is an application layer request-response protocol in which a client submits a HTTP request message to a server, which returns a response message to the client.

In some embodiments, host 22 exchanges HTTP messages with a remote host 24. Host 22 may receive a HTTP message that was fragmented by the remote network node 24 and sent in multiple packets, in accordance with the underlying transport protocol.

In some embodiments, processing circuitry 56 inspects application level information in the packets comprising a HTTP message such as, for example, the length of the HTTP message. The processing circuitry configures LRO module 62 to coalesce the packets of the HTTP message, and/or configures interrupt moderation module 64 to aim delaying an interrupt signal until the entire packets comprising the HTTP message are received.

Improving Data Transmission Performance Based on Application Level Information

Figure 4:
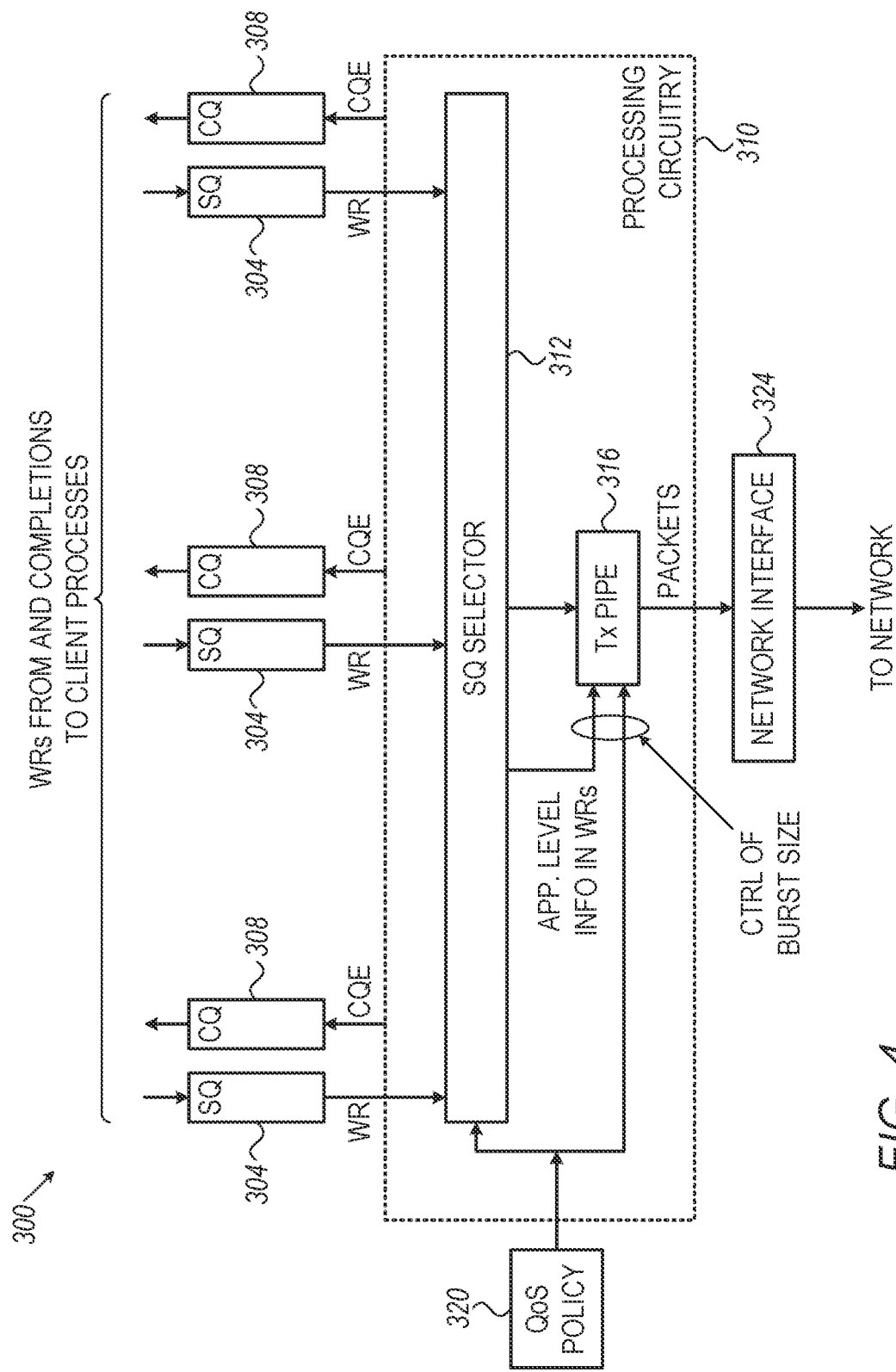
FIG. 4 is a diagram that schematically illustrates a network adapter that controls data transmission based on application level information, in accordance with an embodiment that is described herein.

FIG. 4 is a diagram that schematically illustrates a network adapter that controls data transmission based on application level information, in accordance with an embodiment that is described herein.

In FIG. 4, WRs specifying data transmission operations to one or more destinations are posted on Send Queues (SQs) 304, e.g., by client processes 54 running on CPU 32 of FIG. 1. In the present example, each SQ 304 is associated with a CQ 308 that stores CQEs indicative of execution completion of WRs in the corresponding SQ. SQs 304 and CQs 108 may implement, for example, SQs 47 and CWs 48 of rings 44 in FIG. 1. In FIG. 4, three SQs and three CQs are depicted, by way of example. Alternatively, any other suitable numbers of SQs and CQs can also be used.

SQs 304 and CQs 308 may reside in any suitable memory that is accessible to both CPU 32 and network adapter 40, such as memory 36 of network node 22 or a memory of the network adapter itself (not shown).

Network adapter 300 comprises packet processing circuitry 310 comprising a SQ selector 312, and a Tx pipe 316. SQ selector is configured to select SQs 304 for WR execution by a TX pipe 316. The selector may select the SQs in any suitable order, e.g., using Round Robin (RR) scheduling. In some embodiments, the TX pipe retrieves one or more WRs from a selected SQ for transmitting a burst of data continuously via network interface 324, before SQ selector 312 selects a subsequent SQ.

In the present context, the phrase "transmission data from a SQ" means performing a corresponding data transmission operation by executing a WR in the SQ, wherein the WR specifies the data transmission operation.

In some embodiments, multiple SQs 304 compete on the bandwidth available for transmission via network interface 324. For example, a client process that posts WRs on a given SQ may require a higher transmission bandwidth than client processes posting WRs on other SQs.

In an embodiment, the network adapter comprises a Quality of Service (QoS) policy 320 that specifies bandwidth division among the SQs. For example, the QoS policy specifies the amount of data to transmit continuously from each selected SQ in a single selection cycle. The Tx pipe continuously transmits from a given SQ an amount of data in accordance with the QoS policy.

In some embodiments, at least some of the WRs posted on SQs 304 contain application level information that a client process sends to or receives from a peer client process. In such embodiments, Tx pipe 316 may control the amount of data for continuous transmission from the selected SQ to the given destination, based at least on the application level information. By using the application level information, the network adapter transmits the data much more efficiently.

Consider, for example, a WR that contains application level information indicative of a message size for transmission to a peer client. Note that transmitting based on QoS policy alone may result in a small amount of data left to be transmitted in the next SQ selection cycle. In an embodiment, the TX pipe detects such an event, based on the message length, and extends the transmission burst to transmit to the message end.

Figure 5:
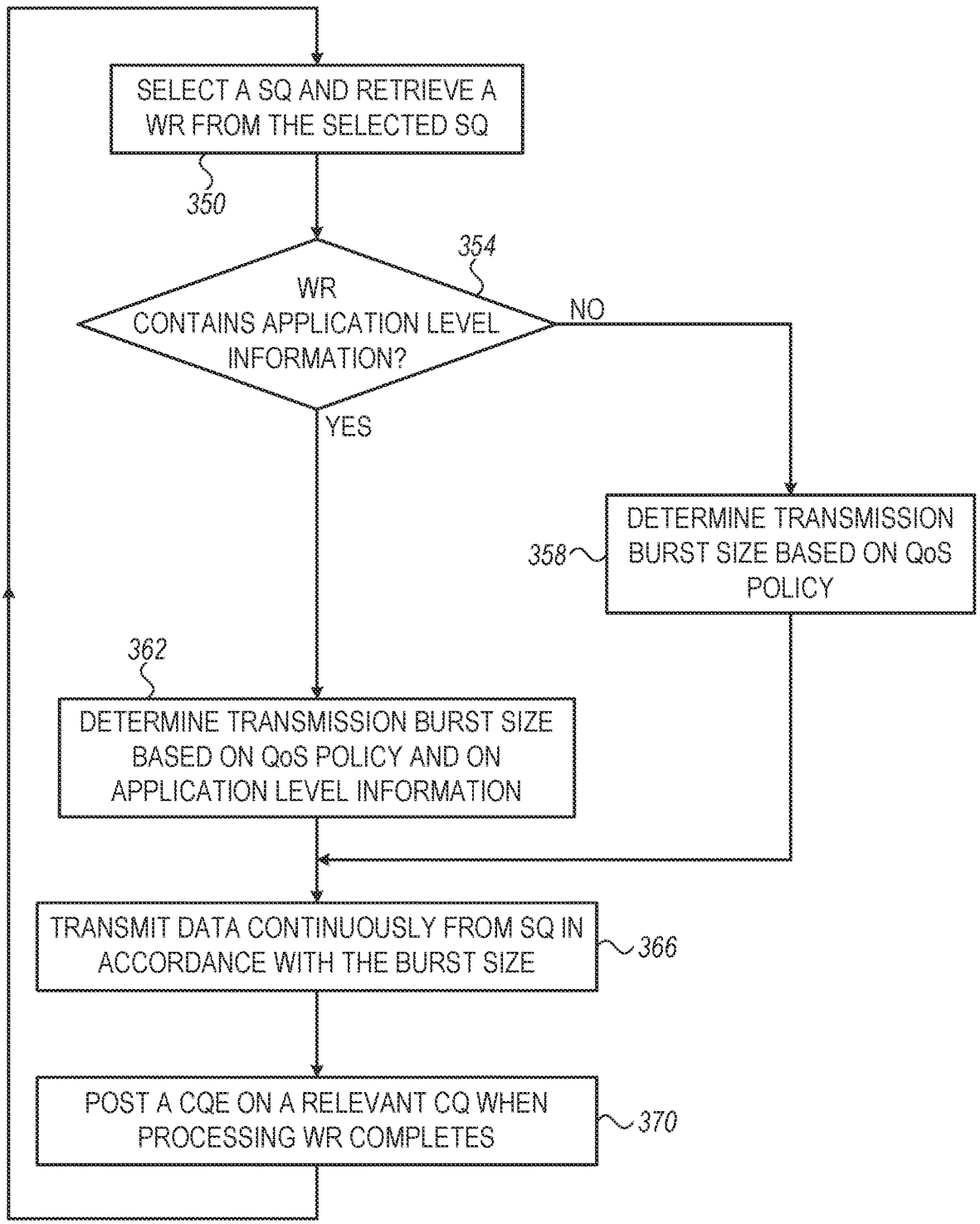
FIG. 5 is a flow chart that schematically illustrates a method for data transmission using application level information, in accordance with an embodiment that is described herein.

FIG. 5 is a flow chart that schematically illustrates a method for data transmission using application level information, in accordance with an embodiment that is described herein.

The method begins with packet processing circuitry 310 selecting a SQ 304 at a selection step 350. The processing circuitry may select the SQ using any suitable selection method such as the Round Robin (RR) method. Further at step 350, the processing circuitry retrieves a WR from the selected SQ, e.g., from the head of the SQ. At a query step 354, the processing circuitry checks whether the WR contains application level information, and if not, determines a transmission burst size based on the QoS policy (320) at a regular burst size step 358. Otherwise, the processing circuitry determines the transmission burst size based both on the QoS policy and the application level information, at an improved burst size determination step 362.

Following each of step 358 and 362, at a transmission step 366, the processing circuitry transmit data continuously from the SQ in accordance with the burst size determined at step 358 or 362. At a completion step 370 the processing circuitry posts a CQE on the CQ associated with the selected SQ, in response to completing executing of the recent WR.

Following step 370, the method loops back to step 350 to select a subsequent SQ.

The configurations of computer system 20, network node 22, and network adapter 40 shown FIG. 1, as well as network adapter 300 in FIG. 4, are example configurations, which are chosen purely for the sake of conceptual clarity. In alternative embodiments, any other suitable computer system, network node and network adapter configurations can also be used. Elements that are not necessary for understanding the principles of the present invention, such as various interfaces, addressing circuits, timing and sequencing circuits and debugging circuits, have been omitted from the figure for clarity.

Some elements of network adapter 40 and network adapter 300, such as packet processing circuitry 56 and packet processing circuitry 310, may be implemented in hardware, e.g., in one or more Application-Specific Integrated Circuits (ASICs) or FPGAs. Additionally or alternatively, packet processing circuitry 56 and packet processing circuitry 310 can be implemented using software, or using a combination of hardware and software elements. Memory 36 may comprise any suitable type of memory using any suitable storage technology such as a Random Access Memory (RAM), a Dynamic RAM (DRAM), a nonvolatile memory such as a Flash memory, or a combination of multiple memory types.

In some embodiments, some of the functions of CPU 32, network adapter 40 and/or network adapter 300, e.g., function of packet processing circuitry 56 and packet processing 310, may be carried out by general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

The embodiments described above are given by way of example, and other suitable embodiments can also be used. For example, although in the embodiments described above network node 22 connects to packet network 30 using a network adapter, any other suitable network device can also be used, e.g., a network device that is implemented in a Graphics Processing Unit (GPU) (not shown).

The embodiments described above refer mainly to layers specified in the OSI model. This, however, is not mandatory, and in alternative embodiments layers in accordance with any other suitable layering model can also be used. Such alternative layering model is assumed to include a transport layer and an application layer similar to those specified in the OSI model.

The methods for extending and/or shortening an LRO session and/or an interrupt moderation session, were described above with reference to storage protocols such as the NVMe/TCP, and communication protocols such as the TLS protocol, and the HTTP. These methods are also applicable for other suitable application storage and communication protocols.

The embodiments described above refer mainly to a scheme in which a client process communicates over a communication network with a peer process running on a remote host. This scheme, however, is not mandatory, and the disclosed embodiments are similarly applicable to schemes in which the client process and the peer process run within the same host and communicate with one another using the disclosed network device. For example, the peer process may run on the same host processor running the client process, or on another processor of the host (not shown). In some embodiments, at least one of the client process and the peer process may run on the host processor in a virtual machine or a container. Other suitable virtualization techniques such as, for example, the Single-Root-Input/Output Virtualization (SR-IOV) technique, may also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
a network interface, configured to connect to a communication network;
a host interface, configured to connect to a host comprising a host processor running a client process; and
processing circuitry configured to:
receive packets belonging to a message having a message length, the message originating from a peer process;
identify, in at least some of the received packets, application-level information specifying the message length;
determine, based on the identified message length, that the packets of the message already received comprise only a portion of the message; and
in response to determining that the client process expects to receive a full message, delay reporting, to the client process, of the packets of the message already received.

2. The network device according to claim 1, wherein the processing circuitry is configured to select which of the received packets are to be reported to the client process.

3. The network device according to claim 1, wherein the processing circuitry is configured to initiate reporting of one or more of the received packets by terminating a coalescing session that coalesces multiple packets into a single packet.

4. The network device according to claim 3, wherein the processing circuitry is configured to terminate the coalescing session based on a session matching criterion and on one or more parameters selected from a list of parameters comprising: (i) a maximal coalesced packet size, and (ii) a coalescing timeout period.

5. The network device according to claim 1, wherein the processing circuitry is configured to initiate reporting of one or more of the received packets by selecting a timing of reporting the one or more of the received packets.

6. The network device according to claim 5, wherein the processing circuitry is configured to initiate the reporting by issuing an interrupt signal at the selected timing for notifying the client process of the one or more received packets.

7. The network device according to claim 5, wherein the processing circuitry is configured to select the timing based on one or more parameters selected from a list of parameters comprising: (i) a number of packets to receive before issuing the interrupt signal, and (ii) a timeout period for issuing the interrupt signal.

8. The network device according to claim 1, wherein the processing circuitry is configured to initiate reporting of one or more of the received packets so as to reduce a number of cycles required by the host processor running the client process to handle the received packets.

9. The network device according to claim 1, wherein the processing circuitry is configured to determine, based on the message length, a number of packets to receive before reporting the message to the client process.

10. The network device according to claim 1, wherein the peer process runs on (i) a remote host coupled to the communication network, (ii) the host processor, or (iii) another processor of the host.

11. A method for communication, comprising:
in a network device coupled to a host that comprises a host processor running a client process, receiving packets belonging to a message having a message length, the message originating from a peer process;
identifying, in at least some of the received packets, application-level information specifying the message length;
determining, based on the identified message length, that the packets of the message already received comprise only a portion of the message; and
in response to determining that the client process expects to receive a full message, delaying reporting, to the client process, of the packets of the message already received.

12. The method according to claim 11, and comprising selecting which of the received packets are to be reported to the client process.

13. The method according to claim 11, and comprising initiating reporting of one or more of the received packets by terminating a coalescing session that coalesces multiple packets into a single packet.

14. The method according to claim 13, wherein terminating the coalescing session comprises terminating the coalescing session based on a session matching criterion and on one or more parameters selected from a list of parameters comprising: (i) a maximal coalesced packet size, and (ii) a coalescing timeout period.

15. The method according to claim 11, and comprising initiating reporting of one or more of the received packets by selecting a timing of reporting the one or more of the received packets.

16. The method according to claim 15, wherein initiating the reporting comprises issuing an interrupt signal at the selected timing for notifying the client process of the one or more received packets.

17. The method according to claim 15, wherein selecting the timing comprises selecting the timing based on one or more parameters selected from a list of parameters comprising: (i) a number of packets to receive before issuing the interrupt signal, and (ii) a timeout period for issuing the interrupt signal.

18. The method according to claim 11, and comprising initiating the reporting of one or more of the received packets so as to reduce a number of cycles required by the host processor running the client process to handle the received packets.

19. The method according to claim 11, wherein the method further comprising determining, based on the message length, a number of packets to receive before reporting the message to the client process.

20. The method according to claim 11, wherein the peer process runs on (i) a remote host coupled to the communication network, (ii) the host processor, or (iii) another processor of the host.

21. A network device, comprising:
a network interface, configured to connect to a communication network;
a host interface, configured to connect to a host comprising a host processor running client processes; and
processing circuitry configured to:
initiate a Send Queue (SQ) selection cycle by selecting a SQ among multiple SQs holding work requests that were posted on the SQs by the client processes for transmitting data to one or more destinations over the communication network, the SQ selection cycle being associated with a burst size specifying an amount of data continuously transmitted from the SQ during the SQ selection cycle;
retrieve work requests from the selected SQ for transmitting data to a given destination;
identify, in at least some of the retrieved work requests, application-level information specifying a message length of a message to be transmitted from the SQ to the given destination; and
in response to determining, based on the message length, that a part of the message extends beyond the SQ selection cycle, increase the burst size to include the part of the message.

22. The network device according to claim 21, wherein the processing circuitry is configured to select the SQ in accordance with a predefined schedule, and to control the amount of data for transmitting continuously from the selected SQ, based both on (i) a quality of service policy that divides an available bandwidth among the SQs, and (ii) the application-level information.

23. A method, comprising:
in a network device that connects to a communication network and to a host that runs client processes, initiating a Send Queue (SQ) selection cycle by selecting a SQ among multiple SQs holding work requests that were posted on the SQs by the client processes for transmitting data to one or more destinations over the communication network, the SQ selection cycle being associated with a burst size specifying an amount of data continuously transmitted from the SQ during the SQ selection cycle;
retrieving work requests from the selected SQ for transmitting data to a given destination;
identifying, in at least some of the retrieved work requests, application-level information specifying a message length of a message to be transmitted from the SQ to the given destination; and
in response to determining, based on the message length, that a part of the message extends beyond the SQ selection cycle, increasing the burst size to include the part of the message.

24. The method according to claim 23, wherein the selecting the SQ comprises selecting the SQ in accordance with a predefined schedule, and controlling the amount of data for transmitting continuously from the selected SQ, based both on (i) a quality of service policy that divides an available bandwidth among the SQs, and (ii) the application-level information.

25. A network device, comprising:
a network interface, configured to connect to a communication network;
a host interface, configured to connect to a host comprising a host processor running a client process that mediates between a remote process communicating with the host over the communication network and a storage device coupled to the host, using a remote storage protocol; and
processing circuitry configured to:
receive packets belonging to a message of the remote storage protocol, from the remote process over the communication network, the message having a message length, wherein the received packets are related to performing a storage operation on the storage device;
identify, in at least some of the received packets, application-level information specifying the message length;
determine, based on the identified message length, that the packets of the message already received comprise only a portion of the message; and
in response to determining that the client process expects to receive a full message, delay reporting, to the client process, of the packets of the message already received.

26. A method, comprising:
in a network device that connects to a communication network, and to a host comprising a host processor running a client process that mediates between a remote process communicating with the host over the communication network and a storage device coupled to the host, using a remote storage protocol,
receiving packets belonging to a message of the remote storage protocol, from the remote process over the communication network, the message having a message length, wherein the received packets are related to performing a storage operation on the storage device;
identifying, in at least some of the received packets, application-level information specifying the message length;

determining, based on the identified message length, that the packets of the message already received comprise only a portion of the message; and in response to determining that the client process expects to receive a full message, delaying reporting, to the client process, of the packets of the message already received.

27. The network device according to claim 1, wherein the message is of a message type selected from a list comprising: a Protocol Data Unit (PDU), a record of a Transport Layer Security (TLS) protocol, and a Hypertext Transfer Protocol (HTTP) message.

28. The method according to claim 11, wherein the message is of a message type selected from a list comprising: a Protocol Data Unit (PDU), a record of a Transport Layer Security (TLS) protocol, and a Hypertext Transfer Protocol (HTTP) message.

29. The network device according to claim 1, wherein in response to determining that the client process benefits from receiving less than the entire message, the processing circuitry is configured to initiate reporting the packets of the message already received to the client process, even though the packets already received comprise only a portion of the message.

30. The method according to claim 11, and comprising, in response to determining that the client process benefits from receiving less than the entire message, initiating reporting the packets of the message already received to the client process, even though the packets already received comprise only a portion of the message.

\* \* \* \* \*